United States Patent [19]
Laurent et al.

[11] Patent Number: 4,824,891
[45] Date of Patent: Apr. 25, 1989

[54] ELASTOFORMING DIE/FORM BLOCK COMPRISING LOW-HARDNESS SILICONE ELASTOMER

[75] Inventors: Claude Laurent, Annecy; Paul Rostaing, Vienne; Rene Lyobard, Saint-Priest, all of France

[73] Assignee: Rhone-Poulenc Chimie, Courbevoie, France

[21] Appl. No.: 13,362

[22] Filed: Feb. 11, 1987

[30] Foreign Application Priority Data

Feb. 11, 1986 [FR] France .................................. 86 01993

[51] Int. Cl.$^4$ ................................................. C08K 5/24
[52] U.S. Cl. .................................... 524/264; 524/260; 524/267; 524/490; 524/491; 524/588
[58] Field of Search ............... 524/267, 260, 490, 491, 524/588, 264

[56] References Cited

U.S. PATENT DOCUMENTS 3,998,778 12/1976 Berg et al. ............................ 524/552
4,386,188 5/1983 Grancio et al. ........................ 525/71
4,722,957 2/1988 Braun et al. .......................... 524/267

Primary Examiner—Melvyn I. Marquis
Attorney, Agent, or Firm—Burns, Doane, Swecker & Mathis

[57] ABSTRACT

Resilient, crosslinked silicon elastomers shaped as elastoforming dies or form blocks for the stamping of sheet material workpieces, e.g., ultra-thin sheet metal, and well adopted for applications in the automotive industry, comprise a crosslinked fluid organopolysiloxane including at least one silicon-compatible organic or inorganic plasticizer within the crosslinked network thereof, said at least one plasticizer being stable and nonmigrating under elastoforming stamping conditions, and said at least one plasticizer being present in such amount that said plasticized silicone elastomer has a Shore 00 hardness of less than about 40.

14 Claims, No Drawings

ELASTOFORMING DIE/FORM BLOCK COMPRISING LOW-HARDNESS SILICONE ELASTOMER

BACKGROUND OF THE INVENTION

1. Field of the Invention:

The present invention relates to a resilient support, or form block, made of low-hardness silicone elastomer, and well adopted for use in the stamping of sheet metal workpieces by the elastoforming of ultra-thin steel sheeting.

Although the description which follows more particularly focuses on the elastoforming of sheet metal, that is to say, of thin plates which are typically made of metal, it should nevertheless be understood that the elastoforming process employing the resilient supports according to the present invention is not limited in any way to this application. Thus, the subject elastoforming process may also be used for the forming of thin sheets of plastic materials, in particular for the forming of sheets of polybutene, polyethylene, chlorinated polyethylene, PVC, chlorinated PVC, ABS (acrylonitrile/butadiene/styrene), polycarbonates, polyphenylene oxide, polysulfones, polychlorotrifluoroethylene, cellulose acetate butyrate, cellulose acetate, nylons, nylon 6 and nylon 66. See, in particular, *Polymer Engineering and Science*, vol. 11, No. 2, page 106 (March, 1971).

Thus, in the present description and in the claims to follow, by the term "sheet metal" is intended a general meaning of "thin plate" or "sheet" without any intention to "metal products" only, but including all materials having a degree of plasticity, such as the metals and plastics.

More specifically, the resilient support made of silicone elastomer according to this invention is capable of being used in double-action (mechanical or hydraulic) presses such as, for example, those described in published European Patent Application EP-A-165,133, hereby incorporated by reference.

2. Description of the Prior Art:

The aforenoted '133 application describes a process for stamping sheet metal blanks of substantially constant thickness, hereinafter designated simply as metal sheets, in a double-action press, according to which process the metal sheets to be shaped are arranged on a resilient support, particularly of low-hardness silicone elastomer. A first external slide block, or blank-clamp, is applied to the peripheral part of the metal sheet, and then a second middle slide block is applied to the central part of the metal sheet; the peripheral part of this metal sheet is formed by being allowed to slide under the blank-clamp by means of at least one working portion of the external slide block such as to compensate in some regions of the finished article for the excess surfaces of unchanged thickness of the initial metal sheet in relation to the volume to be formed and, simultaneously, the middle slide block is moved to form the angular spaces of the middle part of the metal sheet by pressing the metal sheet against the surfaces of the middle part of the support. In a process of the above type, in the case where metal sheets having angular spaces and especially sheets of steel having a high elastic limit (for which $E = kg/mm^2$) and which are ultra-thin (thickness below approximately 0.5 mm) are to be stamped in mass production, the low-hardness resilient support creeps in order to deform the middle area of the metal sheet, during the action of the working part of the external slide block on the metal sheet, such as to provide a surface which is substantially equal to the surface of the finished component to be produced. The middle slide block is then moved to form the angular spaces of the middle part of the metal sheet by final creep flow of the support.

In an alternate embodiment, a first external slide block is applied to the peripheral part of the metal sheet, and then a second middle slide block is applied to the middle part of the metal sheet; the peripheral part of the metal sheet to be formed is arranged on a lower blank-clamp forming a container for the resilient support and whose upper face for holding the metal sheet is situated at a level which is higher than that of the working face surface of the resilient support; the first external slide block, whose body has a diameter which is smaller than the lower blank-clamp and which at its periphery comprises an upper blank-clamp interacting with the lower blank-clamp in order to clamp the metal sheet, is applied, the descent of the external slide block is continued against the resilient support to produce the dropping of an edge of the metal sheet blank and creep flow of the mass of the resilient cushion is produced in order to deform the middle part of the metal sheet, such as to provide a surface which is substantially equal to the surface of the finished component to be produced, and then the middle slide block is moved to form the angular spaces and the middle portion of the metal sheet by final creep flow of the support. This alternate embodiment is the subject of French Patent Application No. 85/17,957, filed Dec. 4, 1985.

At page 11 of the aforesaid European Patent Application EP-A-No. 165,133 it is indicated that the resilient support should have a Shore hardness of less than 30 and preferably greater than 10, and that it may consist of a silicone elastomer, at least partly covered, if desired, with a relatively thin skin (for example, 10 to 15 mm) of a stronger and harder material, such as a silicone of Shore hardness 50, or of Teflon having advantageous anti-friction properties.

When the above-mentioned process is being used, the resilient support is subjected to stresses. The pressures may attain values of 500 bars and more. Pressures which are typically used range from 2 to 200 bars. The operating rates of the presses are typically from 10 to 60 strokes per minute. The support may furthermore be subjected to a volume deformation of 100%, which corresponds to a movement of 50% of the substance. In light of these conditions of use, this resilient support must have, in particular, the following properties:

(i) being free from the hazards and the limitations of the hydraulic fluids used for hydroforming under very high pressure;

(ii) being resilient with a high rate of relaxation after deformation (elastic recovery of less than one second);

(iii) having a low energy of deformation and a low hardness;

(iv) being very slightly compressible (degree of compressibility of less than 5% under 500 bars);

(v) being resistant to abrasion and to tearing;

(vi) having adequate fatigue and aging resistance;

(vii) having a sufficient heat resistance when heated by friction;

(viii) having a low heating effect during the deformations involved in the process;

(ix) not contaminating the formed surfaces, particularly when these surfaces are to be painted; and (x) being conveniently handleable.

In said European Patent Application EP-A-No. 165,133 it is indicated that silicones of Shore hardness of less than 30 can be used, but no specific means are given permitting the production of a resilient silicone elastomer support of appropriate hardness and combining all of the properties delineated above.

SUMMARY OF THE INVENTION

Accordingly, a major object of the present invention is the provision of an improved resilient support, or form block, made of silicone elastomer combining the aforementioned desirable properties and which is suitable for elastoforming.

Briefly, the present invention features a resilient support constituting a die made of silicone elastomer for stamping metal sheets by elastoforming, said silicone elastomer comprising, within its crosslinked network, at least one organic or inorganic plasticizer for silicones which remains stable and nonmigrating under the conditions of stamping, in an amount such that a plasticized silicone elastomer is produced having a Shore 00 hardness of less than approximately 40, preferably less than 30. This hardness is determined with the aid of a hardness gauge calibrated according to ASTM standard D 2 240.

DETAILED DESCRIPTION OF THE PREFERRED EMBODIMENTS OF THE INVENTION

More particularly according to the present invention, it has now been demonstrated that not all silicone elastomers are suitable for stamping sheet metal by elastoforming, and that it is necessary to use an elastomer originating from the crosslinking, preferably by casting, of a fluid organopolysiloxane composition which crosslinks either at ambient temperature or when heated to a temperature which is generally below 150° C., by polycondensation or by polyaddition reactions in the presence of a suitable metallic or organic catalyst. As the organic or inorganic plasticizer for the silicones which remains stable and nonmigrating under the conditions of stamping, exemplary for such use are the organic or mineral hydrocarbon oils, diorganopolysiloxane oils, mixed organic/diorganopolysiloxane polymers and certain organic plasticizers which are compatible with silicones, such as polyoxyalkylene/polyorganosiloxane block copolymers, polyalkylbenzenes obtained by the alkylation of benzene with olefins containing a long linear or branched chain, in particular olefins containing 12 carbon atoms and derived from propylene polymerization, described, for example, in French Pat. Nos. 2,392,476 and 2,446,849, polybutylenes of low molecular weight, described in French Pat. Nos. 2,256,231, 2,393,831 and 2,405,985, or petroleum cuts having a boiling point which is preferably higher than 200° C., consisting of a mixture of aliphatic and/or aromatic hydrocarbons.

Preferably, a plasticizer is used which is a diorganopolysiloxane oil having a viscosity of from 0.65 to 5,000 mPa.s at 25° C., preferably from 5 to 1,000, in particular those comprising a concatenation of recurring units of the formula $R_2SiO$, and blocked at each end of the polymer chain by a unit of the formula $R_3SiO_{0.5}$, in which the radicals R are $C_1-C_{10}$ hydrocarbon radicals, such as methyl, ethyl, propyl and octyl radicals, and phenyl, chlorophenyl and 3,3,3-trifluoropropyl radicals.

More specifically, the radicals R are advantageously methyl, chlorophenyl and 3,3,3-trifluoropropyl radicals, at least 50% of the number of radicals R being methyl radicals, not more than 30% being chlorophenyl and 3,3,3-trifluoropropyl radicals.

The above oils are commercially available from silicone manufacturers. In addition, they may be readily prepared by polymerization and rearrangement, with the aid of alkaline or acidic catalysts, of an appropriate mixture of diorganocyclopolysiloxanes and of straight-chain diorganopolysiloxanes of low molecular weight (U.S. Pat. Nos. 2,875,172 and 2,954,357). These oils may be used by themselves or mixed with organic plasticizers.

The plasticizer may be introduced into the crosslinked network of the silicone elastomer by addition of the plasticizer to the fluid organopolysiloxane composition before crosslinking.

Another, less convenient but nevertheless feasible method, is to soak the crosslinked silicone elastomer in the plasticizer.

The maximum amount of plasticizer is defined, for each type of plasticizer associated with a particular silicone elastomer, as the quantity above which the organopolysiloxane composition no longer crosslinks.

The minimum amount of plasticizer to be added is defined by the quantity above which a Shore 00 hardness of less than 40, preferably less than 30, is obtained.

Surprisingly and unexpectedly, it is found that the plasticizer, especially when it is a silicone oil, remains incorporated into the elastomer network, even when the latter is subjected to the very severe pressure conditions of elastoforming.

The fluid organopolysiloxane compositions which are capable of being crosslinked by casting in the presence of a metal or organic catalyst are those compositions in most cases formulated in the form of two-component (or 2-pack) compositions which crosslink either by polyaddition reactions substantially by the reaction of $\equiv SiH$ groups borne by a silane or a straight or branched chain organopolysiloxane, or of vinyl groups bonded to the silicon atoms of an organopolysiloxane, in the presence of a compound of a platinum group metal, or by polycondensation reactions of an alpha,omega-dihydroxydiorganopolysiloxane oil with a crosslinking agent, which is a silane bearing at least three hydrolyzable groups (typically alkoxy groups) or a polyalkoxysilane originating from the partial hydrolysis of this silane, in the presence of a metal catalyst, typically a tin compound and/or an organic compound such as amines.

These compositions may additionally, but not necessarily, comprise an inorganic filler, preferably some or all of which is a reinforcing or semi-reinforcing siliceous filler. This reinforcing or semi-reinforcing filler may be, among others, pyrogenic silica, precipitated silica, ground quartz, diatomaceous silicas, or talc. Extenders which may be employed are, in particular, calcium carbonate, mica, aluminum oxide, glass fibers and ballotini.

At least a proportion of the filler may advantageously be treated with a siloxane, such as octamethylcyclotetrasiloxane, with a silazane such as hexamethyldisilazane, or with a silane such as the chlorosilanes.

Fluid polyaddition compositions which may be used to produce resilient supports are, for example, those described in U.S. Pat. Nos. 3,220,972, 3,697,473 and 4,340,709.

Fluid polycondensation compositions which may be used to produce resilient supports are, for example, those described in U.S. Pat. Nos. 3,888,815 and 4,064,096, and in French Pat. No. 2,300,114.

The fluid polyaddition compositions which are more particularly preferred comprise:

(A) a vinylated diorganopolysiloxane oil having a viscosity of from 100 to 100,000 mPa.s at 25° C., comprising at least two vinyl radicals per molecule, the remaining radicals being methyl, ethyl, phenyl and 3,3,3-trifluoropropyl radicals, at least 60% of the number of the organic radicals being methyl radicals;

(B) an organopolysiloxane containing at least three ≡SiH groups per molecule, selected from among the branched organopolysiloxanes and straight-chain diorganopolysiloxanes;

(C) if desired, a coupling agent, typically a straight-chain diorganopolysiloxane containing two SiH groups per molecule, the ratio of the number of ≡SiH groups in (B)+(C) to the number of vinyl radicals in (A) ranging from 0.7 to 2;

(D) if desired, a reinforcing or semi-reinforcing inorganic filler, a proportion of which is preferably treated;

(E) a catalytically effective amount of a platinum or platinum group catalyst. This amount, calculated as the weight of platinum metal, is typically from 2 to 300 ppm based on the weight of (A).

Exemplary of the catalysts which can be used, representative are, in particular: chloroplatinic acid $H_2PtCl_6$, the platinum/vinyl siloxane complexes described in French Pat. No. 1,480,409, U.S. Pat. Nos. 3,715,334, 3,775,452 and 3,814,730 and the complexes of platinum with an organic material which are described in European Pat. Nos. 188,978 and 190,530;

(F) a plasticizer which is a diorganopolysiloxane having a viscosity of from 5 to 3,000 mPa.s at 25° C., preferably from 10 to 1,500, in which the organic radicals are $C_1$-$C_{10}$ alkyl, phenyl, chlorophenyl and 3,3,3-trifluoropropyl radicals, at least 80% of the number of these radicals being methyl radicals.

The organopolysiloxane compositions containing the components (A), (B), (C), (D) and (E) are well known to this art and are described in detail, particularly in the above-mentioned U.S. Pat. Nos. 3,697,473 and 4,340,709.

From 5 to approximately 400 parts of the oil (F), preferably from 20 to 200 parts per 100 parts of the compositions (A)+(B)+(C)+(D)+(E) may be added, such as to adjust the hardness to the desired value, which is below 40 (Shore 00 hardness).

The hardness may also be regulated by means of the amount of filler added. In general, 0 to 60 parts of (D) are added per 100 part of (A). One skilled in this art would experience no difficulty in producing an elastomer having the target Shore 00 hardness, chiefly by making use of the amounts of (D) and (F).

The composition charged with the oil (F) may be provided either as a single pack or in two packs.

To enable it to be supplied in a single pack, it is necessary to add a platinum inhibitor, for example, those described in U.S. Pat. No. 3,445,420, or published European Patent Application EP-A-No. 146,422.

Exemplary of fluid organopolysiloxane compositions which are supplied as two-components and which crosslink by polycondensation reactions, there are more particularly selected those compositions comprising:

(1) at least one alpha,omega-dihydroxydiorganopolysiloxane polymer having a viscosity of 20 to 500,000 mPa.s at 25° C. in which the organic radicals are methyl, vinyl, phenyl and 3,3,3-trifluoropropyl radicals, at least 60% thereof being methyl radicals, up to 20% thereof being phenyl radicals and not more than 2% thereof being vinyl radicals;

(2) if desired, a reinforcing or semi-reinforcing inorganic filler;

(3) at least one crosslinking agent selected from among the polyalkoxysilanes and polyalkoxysiloxanes. In general, 0.5 to 15 parts of agent (3) are used per 100 parts of oil (1);

(4) a catalytically effectiveamount of a tin catalyst. This amount typically ranges from 0.005 to 1 part (calculated as the weight of tin metal) per 100 parts of oil (1); and (5) a plasticizer comprising a diorganopolysiloxane having a viscosity of from 5 to 3,000 mPa.s at 25° C., preferably from 10 to 1,500, in which the organic radicals are $C_1$-$C_{10}$ alkyl, phenyl, chlorophenyl vinyl and 3,3,3-trifluoropropyl radicals, at least 80% of the number of these radicals being methyl radicals.

The two-component compositions comprising the above components (1) to (4) are well known to this art and are described in detail, particularly in the above-mentioned French Pat. No. 2,300,114 and in U.S. Pat. No. 3,642,685, British Pat. No. 1,024,234 and European Pat. No. 184,522.

The crosslinking agents (3) are well-known materials, described in particular in French Pat. Nos. 1,330,625, 2,121,289, 2,121,631 and 2,458,572.

Representative, for example, are the silanes of the formulae:

$CH_3Si(OCH_3)_3$
$CH_3Si(OCH_2CH_3)_3$
$CH_3Si(OCH_2CH_2OCH_3)_3$
$Si(OCH_2CH_2OCH_3)_4$
$Si(OCH_3)_4$
$Si(OCH_2CH_3)_4$
$CH_2=CHSi(OCH_2CH_2OCH_3)_3$
$C_6H_5Si(OCH_3)_3$
$C_6H_5Si(OCH_2CH_2OCH_3)_3$ $$CH_3Si(OCH_2-\underset{\underset{CH_3}{|}}{CH}OCH_3)_3$$

Among the crosslinking agents (3), those more particularly preferred are the alkyltrialkoxysilanes, alkyl silicates and alkyl polysilicates, in which the organic radicals are alkyl radicals containing from 1 to 4 carbon atoms.

The alkyl silicates are advantageously selected from among methyl silicate, ethyl silicate, isopropyl silicate, n-propyl silicate and polysilicates comprising the products of partial hydrolysis of such silicates; these are polymers having a high proportion of recurring units of the formula $(R^4O)_2SiO$ and a low proportion of recurring units of the formula $(R^4O)_3SiO_{0.5}$, $R^4OSiO_{1.5}$ and $SiO_2$; the symbol $R^4$ denoting methyl, ethyl, isopropyl and n-propyl radicals. Same are usually characterized on the basis of their silica content, which is established by determining the product of complete hydrolysis of a sample.

The polysilicate is advantageously, in particular, a partially hydrolyzed ethyl silicate marketed under the trademark "Ethyl Silicate-40" ® by Union Carbide Corporation, or a partially hydrolyzed propyl silicate.

Compound (4) is a tin catalyst compound for catalyzing a composition of this type, and which, in particular, is advantageously a tin salt of a mono- or dicarboxylic acid. Such tin carboxylates are particularly described in Noll, *Chemistry and Technology of Silicones*, 2nd Edition, page 337, Academic Press (1968). Dibutyltin naphthenate, octanoate, oleate, butyrate and dilaurate, and dibutyltin diacetate are especially representative.

It is also possible to use the salts of monocarboxylic acids branched on an aliphatic carbon atom in the alpha-position in relation to the carboxyl group and containing at least 8 carbon atoms per molecule, such as described in French Pat. No. 2,066,159, particularly dibutyltin diversatate.

The tin catalyst compound may also be the product of reaction of a tin salt, especially a tin dicarboxylate, with ethyl polysilicate, as described in U.S. Pat. No. 3,186,963. It is also possible to use the product of reaction of a dialkyldialkoxysilane with a tin carboxylate, as described in U.S. Pat. No. 3,862,919.

It is also possible to use the product of reaction of an alkyl silicate or of an alkyltrialkoxysilane with dibutyltin diacetate, as described in Belgian Pat. No. 842,305.

In order to adjust the hardness to the required value, which is below 40 (Shore 00 hardness), there may be added from 50 to 500 parts of oil (5), preferably from 80 to 250 parts per 100 parts of the composition (1)+(2)+(3)+(4). This hardness may generally be adjusted using the amount of added filler. Between 0 and 50 parts of fillers are typically added per 100 parts of oil (1).

In an alternate embodiment, the resilient support according to the invention may be enclosed on at least a portion of its surface, in particular that in contact with the slide blocks and the sheet metal, by a protective membrane of harder elastomer made, for example, of polyurethane, polybutadiene or natural or synthetic rubber of Shore A hardness greater than 30 and preferably below 90, preferably between 35 and 80, and typically between 0.5 and 25 mm in thickness.

This membrane is particularly useful for ensuring the sealing of the die when the pressure increases and makes it possible to avoid contamination of the metal sheet by the silicones. In addition, in the case where the resilient supports are very soft, it enables such supports to be readily handled.

The material of which this membrane is fabricated must have elastic recovery properties which are as close as possible to those of the resilient support, in order not to disturb its operation.

This membrane also extends the useful life of the resilient support.

The composite silicone resilient support of the above type may be produced in various ways:

1. The elastomer may be cast in a receptacle formed by the membrane of harder, rigid elastomer, of suitable dimensions such that the composite resilient support is arranged in the plate container (hereinafter designated the container) receiving the slide blocks of the press;

2. The elastomeric composition which is to form the membrane may be sprayed and crosslinked on the inner walls of the die container and then the elastomeric silicone composition may be cast and crosslinked, and then a film of polyurethane may be arranged or bonded onto the upper face of the soft crosslinked support, for example, using a silicone adhesive;

3. A continuous membrane layer may be arranged around the silicone elastomer resilient support using rotational molding, or employing overmolding in a press;

4. The elastomeric composition may be cast and crosslinked directly in the die container and then the membrane may be arranged or bonded to the free outer surface of the resilient support.

Although polyurethane and rubber films produce the best results, they can nevertheless be replaced with Teflon, with a silicone elastomer, or the like.

The resilient support may include one or more resilient members arranged side by side and/or superposed inside the die container.

In order to further illustrate the present invention and the advantages thereof, the following specific examples are given, it being understood that same are intended only as illustrative and in nowise limitative. In said examples to follow, as was the case with the foregoing description, all parts and percentages are given by weight, unless otherwise indicated.

The double-action press used in these examples is of the type as that described in FIGS. 5 to 9 of the aforementioned European Pat. No. 165,133. The component produced is that shown in FIG. 11 of the same patent.

EXAMPLE 1:

The following organopolysiloxane composition $A_1$ was cast into cylindrical metal molds having an internal diameter of 320 mm and a height of 50 mm:

(i) 100 parts of a dimethylpolysiloxane oil having a viscosity of 600 mPa.s at 25° C., containing dimethylvinylsiloxy end groups (0.4% by weight of vinyl groups);

(ii) 41.5 parts of pyrogenic silica having a specific surface area of 300 $m^2/g$, treated with hexamethyldisilazane;

(iii) 4 parts of a trimethylsiloxy-blocked dimethylpolysiloxane copolymer containing hydromethylsiloxy recurring units in the polymer chain (0.24% by weight of hydrogen atoms bonded to silicon) and containing approximately 120 silicon atoms per molecule;

(iv) 4 parts of a dimethylpolysiloxane polymer containing dimethylhydrosiloxy end groups and having a viscosity of 30 mPa.s at 25° C.;

(v) 20 ppm of platinum in the form of a platinum complex prepared from chloroplatinic acid and 1,3-divinyl-1,1,3,3-tetramethyldisiloxane, as described in Example 4 of U.S. Pat. No. 3,814,730; and (vi) 0.1% by weight of 2-octyn-3-ol inhibitor, based on the total weight of the composition.

During the casting, 110 parts of dimethylpolysiloxane oil blocked with a trimethylsiloxy unit at each of its polymer ends and having a viscosity of 50 mPa.s at 25° C. were mixed with 100 parts of the above composition $A_1$. The mixture crosslinked after heating for two hours at 60° C.

Very good homogeneity of the crosslinked product was noted, and this was typical of good plasticizer miscibility.

Four cylindrical elastomer supports having a Shore 00 hardness value of 18, 24 hours after crosslinking, were obtained, and were stacked to fill the interior of the die container of the double-action press. A component identical to that of FIG. 11 of European Pat. No. 165,133 was produced using a sheet of HEL steel, E=60 kg/mm², 40/100 mm in thickness.

The drawing depth was 80 mm, the pressure was 100 bars, 20 blanks were formed per minute, and 300,000 blanks were formed without changing the resilient support and without stopping the press. The support plasticizer had not exuded.

The components produced were of substantially constant thickness, without wrinkles at the angles and showed no defect in the region of the die entry radii.

EXAMPLES 2 TO 5:

To carry out these examples, the procedure of Example 1 was repeated, except that a more viscous silicone plasticizer was employed. X parts by weight of trimethylsiloxy-blocked dimethylpolysiloxane oil having a viscosity of 100 mPa.s at 25° C. were added during the casting to 100 parts of the composition $A_1$ described in Example 1.

The mixture crosslinked after heating for two hours at 80° C. Very good plasticizer miscibility was noted.

The Shore 00 hardness (SH 00) was determined 24 hours after crosslinking. The plasticizer did not exude after use in the press.

The results are reported in Table 1 below:

TABLE I

| Example      | 2   | 3   | 4   | 5   |
|--------------|-----|-----|-----|-----|
| $A_1$        | 100 | 100 | 100 | 100 |
| Plasticizer X| 37  | 46  | 110 | 140 |
| SH 00 - 24 hr| 38  | 34  | 17  | 9   |

EXAMPLES 6 TO 8:

The procedure of Example 1 was repeated, except that, during the casting in the mold, there were added to 100 parts of composition $A_1$, X parts by weight of an organic plasticizer which was a polyalkylbenzene produced by the alkylation of benzene using olefins derived from the polymerization of propylene and marketed by the French company Petrosynthese under the trademark Alkylat 150 DT ®.

The Shore 00 hardness (SH 00) was measured after eight hours following crosslinking.

The miscibility (G: good, M: mediocre) and the exudation (N: none, S: slight) were assessed visually on the press under the conditions employed in Example 1.

The results are reported in Table II below:

TABLE II

| Example       | 6   | 8   | 8   |
|---------------|-----|-----|-----|
| $A_1$         | 100 | 100 | 100 |
| Alkylat 150 DT| 20  | 30  | 40  |
| SH 00 - 8 hr  | 28  | 10  | 4   |
| Miscibility   | G   | G   | G   |
| Exudation     | S   | S   | S   |

EXAMPLE 9:

A mixture was cast in a rectangular die container which had a continuous internal coating of 3-mm thick polyurethane of Shore A hardness 55, of internal dimensions 790 mm × 358 mm and 200 mm in height, of a fluid organopolysiloxane composition prepared beforehand in the following manner:

the following dough was prepared in a multiblade mixer maintained under a nitrogen atmosphere:

(i) 100 parts of a dimethylpolysiloxane oil having a viscosity of 500 mPa.s at 25° C., blocked at each polymer end with a $(CH_3)_3SiO_{0.5}$ unit;

(ii) 40 parts of a pyrogenic silica of specific surface area 200 m$^2$/g containing 1.5% of adsorbed water;

(iii) 32 parts of distilled water; and (iv) 80 parts of hexamethyldisilazane.

This mixture was stirred for 6 hours at 20° C. and was then devolatilized by heating for 6 hours at 153° C. under a stream of nitrogen.

The following materials were then added to the mixture, cooled to approximately 80° C.:

(i) 100 parts of an alpha,omega-dihydroxydimethylpolysiloxane oil having a viscosity of 14,000 mPa.s at 25° C.;

(ii) 2 parts of alpha,omega-dihydroxydimethylpolysiloxane oil having a viscosity of 50 mPa.s at 25° C.; and (iii) 100 parts of ground quartz having a specific surface area of 5 m$^2$/g, a mean particle diameter of 5 micrometers and containing 1% of adsorbed water.

The entire mass was compounded for two hours and was then ground.

To 1,000 parts of the above dough, there was added and mixed in the die container 1,003 parts of a mixture consisting of:

(i) 1,000 parts of dimethylpolysiloxane oil blocked with trimethylsiloxy units at each polymer end, having a viscosity of 100 mPa.s at 25° C.;

(ii) 2.4 parts of ethyl polysilicate; and (iii) 0.6 part of dibutyltin dilaurate.

The mixture crosslinked in 24 hours, cold. Very good plasticizer miscibility was noted.

The resilient support had a Shore 00 hardness of 30, 24 hours after crosslinking.

After crosslinking, a polyurethane film with a Shore A hardness of 55 and 3 mm thick was bonded to the entire free upper surface of the resilient support, defined by the edge of the polyurethane container, using a silicone adhesive.

The same sheet metal blanks as in Example 1 were used in order to elastoform components of the same shape.

The drawing depth was 100 mm.

The pressure was 100 bars, 20 blanks per minute were formed and 200,000 blanks were formed without stopping the press and without changing the resilient support.

The components produced were of the same quality as that obtained in Example 1.

The plasticizer had not exuded from the support.

EXAMPIE 10:

A composition Cl was prepared by mixing:

(i) 100 parts of an alpha,omega-dihydroxydimethylpolysiloxane oil having a viscosity of 60,000 mPa.s at 25° C.;

(ii) 95 parts of dimethylpolysiloxane oil blocked with a $(CH_3)_3SiO_{0.5}$ unit at each polymer end, having a viscosity of 50 mPa.s at 25° C.; and (iii) 135 parts of ground quartz having a particle size distribution between 0.5 and 10 micrometers, containing 400 ppm of water.

2 parts of ethyl polysilicate and 0.35 parts of dibutyltin dilaurate were added to 100 parts of the above composition $C_1$. A composition $C_2$ was obtained.

During the casting, 60 parts of a dimethylpolysiloxane oil blocked with a $(CH_3)_3SiO_{0.5}$ unit at each polymer end, having a viscosity of 100 mPa.s at 25° C. were added to 100 parts of composition $C_2$. The mass crosslinked at ambient temperature in the same cylindrical mold as that used in Example 1.

After 24 hours, the Shore 00 hardness was 26. The miscibility of the plasticizing oil was very good and this oil did not exude even after use in the press under the same conditions as in Example 1.

EXAMPLES 11 AND 12:

The procedure of Example 10 was repeated, except that X parts of the same plasticizing oil were added during the casting to 100 parts of composition $C_2$.

The miscibility was good and no exudation was noted. The Shore 00 hardness was measured after 24 hours following crosslinking.

The results are reported in Table III below:

TABLE III

| Example | 11 | 10 | 12 |
|---|---|---|---|
| $C_2$ | 100 | 100 | 100 |
| Plasticizer X | 40 | 60 | 100 |
| SH 00 | 35 | 26 | 12 |

EXAMPLES 13 TO 16:

These examples were carried out by starting with 100 parts of composition $C_2$ described in Example 10 and adding, during the casting, X parts by weight of an alkylate which was a polyalkylbenzene produced by the alkylation of benzene using olefins produced by the polymerization of propylene and marketed by Sociét/é Francaise de Petrosynthèse under the trademark Alkylat 150 DT ®. The composition was cast in the cylindrical mold used in Example 1. The Shore 00 hardness was measured. The miscibility (G: good, M: mediocre) and the exudation (N: none, S: slight, H: high) were assessed visually in the press under the conditions of use of Example 1.

The results are reported in Table IV below (SH 00 = Shore hardness 00):

TABLE IV

| Example | 13 | 14 | 15 | 16 |
|---|---|---|---|---|
| $C_2$ | 100 | 100 | 100 | 100 |
| Alkylat | 30 | 40 | 50 | 60 |
| SH 00 | 40 | 38 | 35 | 28 |
| Miscibility | G | G | G | G |
| Exudation | S | S | S | S |

EXAMPLES 17 TO 25:

The procedures were exactly the same as in Examples 12 to 16, except that the alkylate was replaced with a trimethylsiloxy-blocked copolymer containing dimethylsiloxy and tetrachlorophenylsiloxy recurring units, marketed by Rhône-Poulenc under the trademark Huile 508 V 70 and originating from the cohydrolysis of tetrachlorophenyltrichlorosilane, dimethyldichlorosilane and trimethylchlorosilane. The Shore 00 hardness was measured after 24 hours.

The results are reported in Table V below:

TABLE V

| Example | 17 | 18 | 19 | 20 | 21 | 22 | 23 | 24 | 25 |
|---|---|---|---|---|---|---|---|---|---|
| $C_2$ | 100 | 100 | 100 | 100 | 100 | 100 | 100 | 100 | 100 |
| 508 V 70 X | 30 | 30 | 40 | 50 | 60 | 70 | 80 | 90 | 100 |
| SH 00 - 24 h | 40 | 39 | 33 | 30 | 25 | 22 | 15 | 12 | 6 |
| Miscibility | G | G | G | G | G | G | G | G | G |
| Exudation | N | N | N | N | N | N | N | N | N |

EXAMPLES 26 TO 32:

The procedures were exactly the same as in Examples 12 to 16, except that the alkylate was replaced by a petroleum cut having a boiling point of approximately 250° C., consisting essentially of aliphatic hydrocarbons and marketed by Esso-Chimie under the trademark Exsol D 100 ®.

The Shore 00 hardness was measured after 24 hours and after 15 days (following crosslinking at ambient temperature).

The results are reported in Table VI below:

TABLE VI

| Example | 26 | 27 | 28 | 29 | 30 | 31 | 32 |
|---|---|---|---|---|---|---|---|
| $C_2$ | 100 | 100 | 100 | 100 | 100 | 100 | 100 |
| Exsol-X | 40 | 50 | 60 | 70 | 80 | 90 | 100 |
| SH 00 - 24 h | 40 | 35 | 25 | — | — | — | — |
| SH 00 - 15 d | 40 | 38 | 30 | 20 | 15 | 5 | 2 |
| Miscibility | G | G | G | G | G | G | G |
| Exudation | N | N | N | N | N | N | N |

EXAMPLES 33 TO 37:

The procedures were exactly the same as in Examples 12 to 16, except that the alkylate was replaced with a polybutylene of low molecular weight (approximately 455) marketed by B. P. Chimie under the trademark Napvis D07 ®.

The Shore 00 hardness was measured after 8 hours following crosslinking at ambient temperature.

The results are reported in Table VII below:

TABLE VII

| Example | 33 | 34 | 35 | 36 | 37 |
|---|---|---|---|---|---|
| $C_2$ | 100 | 100 | 100 | 100 | 100 |
| D 07 X | 30 | 40 | 50 | 60 | 70 |
| SH 00 | 40 | 35 | 30 | 25 | 25 |
| Miscibility | G | G | G | G | G |
| Exudation | N | S | S | S | High |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A resilient, crosslinked silicone elastomer shaped as an elastoforming die or form block for the stamping of sheet material workpieces, said silicone elastomer comprising a crosslinked fluid organopolysiloxane including at least one organic or inorganic plasticizer within the crosslinked network thereof, said at least one plasticizer being stable and nonmigrating under elastoforming stamping conditions, and said at least one plasticizer being present in such amount that said plasticized silicone elastomer has a Shore 00 hardness of less than about 40.

2. The shaped silicone elastomer elastoforming die or form block as defined by claim 1, said at least one plasticizer comprising a hydrocarbon oil, diorganopolysiloxane oil, or mixed organic/diorganopolysiloxane polymer.

3. The shaped silicone elastomer elastoforming die or form block as defined by claim 1, said at least one plasticizer comprising a diorganopolysiloxane oil having a viscosity of from 0.65 to 5,000 mPa.s at 25° C.

4. The shaped silicone elastomer elastoforming die or form block as defined by claim 1, said silicone elastomer comprising the following crosslinked organopolysiloxane composition:

(A) a vinylated diorganopolysiloxane oil having a viscosity of from 100 to 100,000 mPa.s at 25° C., containing at least two vinyl radicals per molecule, the remaining radicals being methyl, ethyl, phenyl or 3,3,3-trifluoropropyl radicals, at least 60% of the number of such organic radicals being methyl radicals;

(B) an organopolysiloxane containing at least three $\equiv$SiH groups per molecule, which comprises a branched organopolysiloxane or a straight-chain diorganopolysiloxane;

(C) a reinforcing or semi-reinforcing inorganic filler;

(D) a catalytically effective amount of a platinum group metal catalyst; and (E) a plasticizer which comprises a diorganopolysiloxane having a viscosity of from 5 to 3,000 mPa.s at 25° C., in which the organic radicals are $C_1$–$C_{10}$ alkyl, phenyl, chlorophenyl or 3,3,3-trifluoropropyl radicals, with the proviso that at least 80% of the organic radicals are methyl radicals.

5. The shaped silicone elastomer elastoforming die or form block as defined by claim 4 further comprising (F) a coupling agent which comprises a straight-chain diorganopolysiloxane containing two $\equiv$SiH groups per molecule, the ratio of the number of $\equiv$SiH groups is (B)+(F) to the number of vinyl radicals in (A) ranging from 0.7 to 2.

6. The shaped silicone elastomer elastoforming die or form block as defined by claim 5, comprising from 5 to 400 parts of oil (E) per 100 parts of (A)+(B)+(C)+(D)+(F).

7. The shaped silicone elastomer elastoforming die or form block as defined in claim 1, said silicone elastomer comprising the following crosslinked organopolysiloxane composition:

(1) at least one alpha, omega-dihydroxydiorganopolysiloxane polymer having a viscosity of 20 to 500,000 mPa.s at 25° C., in which the organic radicals are methyl, vinyl, phenyl or 3,3,3-trifluoropropyl radicals, with the proviso that at least 60% of the organic radicals are methyl radicals, up to 20% phenyl radicals, and not more than 2% vinyl radicals;

(2) a reinforcing or semi-reinforcing inorganic filler;

(3) at least one polyalkoxysilane or polyalkoxysiloxane crosslinking agent;

(4) a catalytically effective amount of a tin catalyst; and (5) a plasticizer which comprises a diorganopolysiloxane having a viscosity of from 5 to 3,000 mPa.s at 25° C., in which the organic radicals are $C_1$–$C_{10}$ alkyl, phenyl, chlorophenyl, vinyl or 3,3,3-trifluoropropyl radicals, the organic radicals being an admixture of at least 80% methyl radicals.

8. The shaped silicone elastomer elastoforming die or form block as defined by claim 7, comprising from 50 to 500 parts of oil (5) per 100 parts of the composition (1)+(2)+(3)+(4).

9. The shaped silicone elastomer elastoforming die or form block as defined by claim 1, said plasticized silicone elastomer having a Shore 00 hardness of less than about 30.

10. The shaped silicone elastomer elastoforming die or form block as defined by claim 3, said diorganopolysiloxane oil plasticizer having a viscosity of from 5 to 1,000 mPa.s at 25° C.

11. The shaped silicone elastomer elastoforming die or form block as defined by claim 4, said diorganopolysiloxane plasticizer (E) having a viscosity of from 10 to 1,500 mPa.s at 25° C.

12. The shaped silicone elastomer elastoforming die or form block as defined by claim 6, comprising from 20 to 200 parts of oil (E) per 100 parts of (A)+(B)+(C)+(D)+(F).

13. The shaped silicone elastomer elastoforming die or form block as defined by claim 7, said diorganopolysiloxane plasticizer (5) having a viscosity of from 10 to 1,500 mPa.s at 25° C.

14. The shaped silicone elastomer elastoforming die or form block as defined by claim 8, comprising from 80 to 250 parts of oil (5) per 100 parts of the composition (1)+(2)+(3)+(4).

* * * * *